United States Patent
Jeon

(10) Patent No.: US 9,139,168 B2
(45) Date of Patent: Sep. 22, 2015

(54) PEDAL SIMULATOR HAVING MULTI-STAGE SERIES SPRING

(71) Applicant: Hyundai Motor Company, Seoul (KR)

(72) Inventor: Gab Bae Jeon, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 170 days.

(21) Appl. No.: 13/689,253

(22) Filed: Nov. 29, 2012

(65) Prior Publication Data
US 2014/0117602 A1    May 1, 2014

(30) Foreign Application Priority Data

Oct. 26, 2012    (KR) .......................... 10-2012-0120045

(51) Int. Cl.
 *B60T 7/04*  (2006.01)
 *B60T 11/18* (2006.01)
 *B60T 8/40*  (2006.01)

(52) U.S. Cl.
 CPC . *B60T 7/04* (2013.01); *B60T 7/042* (2013.01); *B60T 11/18* (2013.01); *B60T 8/409* (2013.01); *B60T 8/4086* (2013.01)

(58) Field of Classification Search
 CPC ................................. B60T 8/409; B60T 8/4086
 USPC .......... 303/155, 113.4; 60/562; 267/168, 282, 267/290; 74/512, 513
 See application file for complete search history.

(56) References Cited

U.S. PATENT DOCUMENTS

| | | | |
|---|---|---|---|
| 3,603,610 A * | 9/1971 | Thompson | 267/221 |
| 6,347,518 B1 * | 2/2002 | Kingston et al. | 60/552 |
| 6,672,685 B2 * | 1/2004 | Ishimura et al. | 303/113.4 |
| 2005/0110341 A1 | 5/2005 | Kusano | |
| 2011/0273006 A1 * | 11/2011 | Nakazawa | 303/10 |
| 2012/0007419 A1 * | 1/2012 | Sellinger et al. | 303/15 |
| 2014/0069093 A1 * | 3/2014 | Kim | 60/553 |
| 2014/0109565 A1 * | 4/2014 | Chiba et al. | 60/445 |

FOREIGN PATENT DOCUMENTS

| | | |
|---|---|---|
| JP | 10-81227 A | 3/1998 |
| JP | 2002-293229 A | 10/2002 |
| JP | 2008-222028 A | 9/2008 |
| KR | 10-2004-0079701 A | 9/2004 |
| KR | 10-1024743 B1 | 3/2011 |
| KR | 10-2011-0075891 A | 7/2011 |
| WO | WO 2006/042823 A1 | 4/2006 |

* cited by examiner

*Primary Examiner* — Bradley King
(74) *Attorney, Agent, or Firm* — Morgan, Lewis & Bockius LLP

(57) ABSTRACT

A pedal simulator using a multi-stage series spring includes a cylinder into which an operation rod connected to a brake pedal is inserted; a piston installed in the cylinder to receive a force of the operation rod; a plurality of springs installed between the cylinder and the piston to resiliently support the piston in the cylinder and disposed to overlap each other from an inner side to an outer side; and a plurality of spring seats disposed in the cylinder to overlap each other from an inner side to an outer side and configured to support the springs while being interposed between the springs, wherein the springs are installed between the piston, the spring seats, and the cylinder such that the plurality of springs are connected to each other in a multi-stage series structure.

4 Claims, 12 Drawing Sheets

(a) Two springs are disposed in parallel (b) Four springs are disposed in parallel (c) Four springs are disposed in parallel

PEDAL SIMULATOR HAVING MULTI-STAGE SERIES SPRING

CROSS-REFERENCE TO RELATED APPLICATION

The present application claims priority of Korean Patent Application Number 10-2012-0120045 filed Oct. 26, 2012, the entire contents of which application is incorporated herein for all purposes by this reference.

BACKGROUND OF INVENTION

1. Field of Invention

The present invention relates to a pedal simulator of a brake apparatus for a vehicle, and more particularly, to a pedal simulator which can minimize increases in an entire length of a spring and a volume of a cylinder even if a plurality of springs in a multi-stage series form.

2. Description of Related Art

In general, a brake apparatus for a vehicle is adapted to slow or stop a traveling vehicle or maintain the stopped state of the vehicle, and a braking operation is performed by converting kinetic energy of the vehicle into thermal energy due to mechanical friction and dissipating the frictional heat into the air.

Such brake apparatuses for a vehicle include drum type hydraulic brakes and disk type hydraulic brakes. Among them, a disk type hydraulic brake strongly presses a disk rotating together with a wheel at opposite sides with a friction pad instead of a drum to obtain a braking force.

However, the hydraulic brake has a complex structure due to a mechanical element connected to a brake pedal, a hydraulic pressure pipe, and an element for controlling a hydraulic pressure.

Thus, electro-mechanical brakes (EMBs) are being recently developed and used to simplify the configuration thereof.

Such an electro-mechanical brake refers to a brake for pressing a friction pad by using a mechanical structure driven by an electric motor to obtain a braking force unlike a general hydraulic brake.

An electro-mechanical brake includes an actuator having a motor rotated forwardly and reversely to perform a braking operation or releasing the braking operation, and presses the friction pad by using a rotating force of the motor to press a disk (generate frictional with the disk).

Further, the electro-mechanical brake receives a brake intention of a driver through a brake pedal and adjusts braking pressures of front and rear wheels by using a motor.

The electro-mechanical brake is a new-generation brake concept, and is expected to be applied to an environment-friendly vehicle such as an electric vehicle as it has a quick response speed and enables a precise control as compared with a hydraulic brake.

The electro-mechanical brake may be realized by a system combined with a hydraulic brake, and for example, a hydraulic brake is applied to a front wheel and an electro-mechanical brake is applied to a rear wheel, which has a simple structure, has an excellent braking response, and provides an easy control as compared with a system employing only a hydraulic brake according to the related art.

A brake-by-wire (BBW) system in which the electro-mechanical brake is mounted to all the front and rear wheels of a vehicle may be realized, and electric calipers located at the front and rear wheels hold a disk in response to a signal of a control unit to brake the vehicle.

The BBW system transfers a braking intention of a driver by using an electric signal, in which system a mechanical connection is not present between a brake pedal and the wheels, braking forces for the wheels can be independently controlled precisely, and a braking force can be easily controlled to shorten a brake distance, and a braking stability can be increased.

An electronic hydraulic brake (EHB) as another form of the BBW system is a system is a system for allowing a control unit to receive a pedal travel sensor and a signal of a hydraulic sensor in a master cylinder during a braking operation to recognize a braking intention and a required reduction speed, and control a hydraulic pressure of a high-pressure accumulator through a solenoid valve to hydraulically brake the wheel.

Meanwhile, the electro-magnetic brake includes a pedal simulator for providing a pedal feeling such as a hydraulic pressure by using hysterisis characteristics.

The pedal simulator is an apparatus for realizing a pedal feeling like that of a hydraulic brake according to the related art when a driver steps on a pedal, and a brake pedal force of a driver is formed by using the pedal simulator and a braking operation of the driver is supplemented by transferring a proper pedal reaction force to the driver.

The pedal simulator may be variously configured, but includes a cylinder into which an operation rod coupled to a pedal and moved forward and rearward along a stroke of the pedal, and a piston resiliently supported by a spring in the cylinder and moved by the operation rod.

Here, in describing various examples of the configuration for realizing a pedal force, FIGS. 1 to 4 illustrate known pedal simulators 1. A configuration of FIG. 1 in which a plurality of cylinders 6 and 7 in which springs 6b and 7b are installed are connected to a hydraulic cylinder 4 in parallel through a hydraulic pipe 5, and a configuration of FIG. 2 in which a hydraulic cylinder 4 employing a spring 4b therein and a separate cylinder 6 employing a spring 6b therein are connected to each other through a hydraulic pipe 5 are known.

In the configuration of FIG. 1, if a driver steps on a pedal 2, an operation rod 3 is moved to press a piston 4a in a first cylinder 4, and the oil in the first cylinder 4 is sent to a second cylinder 6 and a third cylinder 7 connected to each other in parallel as the piston 4a is moved.

Further, the second cylinder 6 and the third cylinder 7 are provided with pistons 6a and 7a and springs 6b and 7b, and when the oil is distributed from the first cylinder 4, the pistons 6a and 7a are moved. Then, the springs 6b and 7b are pressed to generate reaction forces.

In addition, in order to realizing a pedal feeling, a configuration of FIG. 3 in which a plurality of springs 8b and 8c disposed to support a piston 8b in series are installed in one cylinder 8 and a configuration of FIG. 4 in which a spring 9b and a rubber member (cushion rubber) 9c as resilient members for supporting a piston 9a are combined in one cylinder 9 are known.

In order to secure a displacement necessary for a spring, an entire length of a spring is determined, considering a wire diameter, an effective displacement for securing durable strength, and the like of FIG. 5, and accordingly, as illustrated in FIG. 3, when several springs 8b and 8c are disposed in series, a sum of the spring lengths becomes still larger than the actually necessary displacement, significantly increasing the necessary entire length.

Further, as illustrated in FIG. 6, if the springs 11 are disposed in parallel, a spring mounting space increases.

When a pedal force is generated by using a spring in a general pedal simulator, several springs cannot be used by the spatial restriction, and a pedal simulator having two step inclinations by generally using two springs is configured as in FIG. 3.

However, it is difficult to simulate proper reaction force characteristics of a brake pedal with the two step inclinations, and in comparison with a pedal force generation pattern of a general vehicle as in FIG. 7, a portion different from a general vehicle as indicated by a dotted line is generated when the stroke-pedal force pattern of a general vehicle is simulated with two springs.

Further, as illustrated in FIG. 4, when a rubber member 9c is combined to be used, the stroke-pedal force characteristics vary as the characteristics of the rubber vary according to a temperature change (the stroke-pedal force characteristics vary when a temperature is high and low).

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for a pedal simulator which can simulate stroke-pedal force characteristics of a general vehicle in a maximally similar way, and minimize an entire length of a spring and a volume of a cylinder even when a plurality of springs are connected in series in a multi-stage series form.

Various aspects of the present invention provide for a pedal simulator using a multi-stage series spring, including: a cylinder into which an operation rod connected to a brake pedal is inserted; a piston installed in the cylinder to receive a force of the operation rod; a plurality of springs installed between the cylinder and the piston to resiliently support the piston in the cylinder and disposed to overlap each other from an inner side to an outer side; and a plurality of spring seats disposed in the cylinder to overlap each other from an inner side to an outer side and configured to support the springs while being interposed between the springs, wherein the springs are installed between the piston, the spring seats, and the cylinder such that the plurality of springs are connected to each other in a multi-stage series structure.

Various aspects of the present invention provide for a pedal simulator including: a main cylinder into which an operation rod connected to a brake pedal is inserted, in which a piston for receiving a force of the operation rod is installed, and in which oil is filled to receive a force of the piston; and an auxiliary cylinder connected to the main cylinder through a hydraulic pressure pipe and resiliently supported by a spring while receiving a hydraulic pressure transferred from the main cylinder through the hydraulic pressure pipe, wherein any one or two selected from the main cylinder and the auxiliary cylinder include: a plurality of springs installed between the cylinder and the piston to resiliently support the piston and disposed to overlap each other from an inner side to an outer side; and a plurality of spring seats disposed in the cylinder to overlap each other from an inner side to an outer side and configured to support the springs while being interposed between the springs, and the springs are installed between the piston, the spring seats, and the cylinder such that all the springs are connected to each other in a multi-stage series structure.

Accordingly, the pedal simulator of the present invention may employ a multi-stage series spring structure in which spring seats having a cup shape and disposed to overlap each other from an inner side to an outer side, and springs are disposed between the spring seats to overlap each other from an inner side to an outer side, and has the following effects.

First, increases in an entire length of the spring and a volume of the cylinder can be minimized due to a structure in which the plurality of spring are disposed to overlap each other from an inner side to an outer side in a multi-stage series form even if three or more multi-stage series spring is used unlike the related art.

In particular, the number of springs can be easily increased without greatly increasing the entire length of the spring and the volume of the cylinder, so that stroke-pedal force characteristics of a general vehicle can be simulated in a still more similar way, significantly improving a pedal feeling.

In addition, since even when several springs are disposed in a multi-stage series form, the entire length of the spring and the volume of the system are not greatly increased, the mounting performance of the pedal simulator can be improved.

Further, since the cushion member of a rubber material is used, the stroke-pedal force characteristics can be corrected in sections in which the line inclinations of the springs are greatly changed, and thus a pedal feeling can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

By using a large number of springs are used as compared with the related art in which two springs are disposed in series, a pedal simulator in which an error from a stroke-pedal force pattern of a general vehicle (to which a general brake pedal unit not employing a pedal simulator is applied) can be significantly reduced and stroke-pedal force characteristics of a general vehicle can be simulated in a maximally similar way can be configured.

However, when a plurality of springs is continuously disposed continuously simply in a lengthwise direction of a cylinder, an entire length of the spring significantly increases and a volume thereof also increases. Accordingly, there is a limit in increasing the number of springs in a pedal simulator according to the related art.

Accordingly, the present invention proposes a new type of multi-stage series spring structure which can solve an existing spatial restriction problem by which many springs cannot be used.

Figure 1:
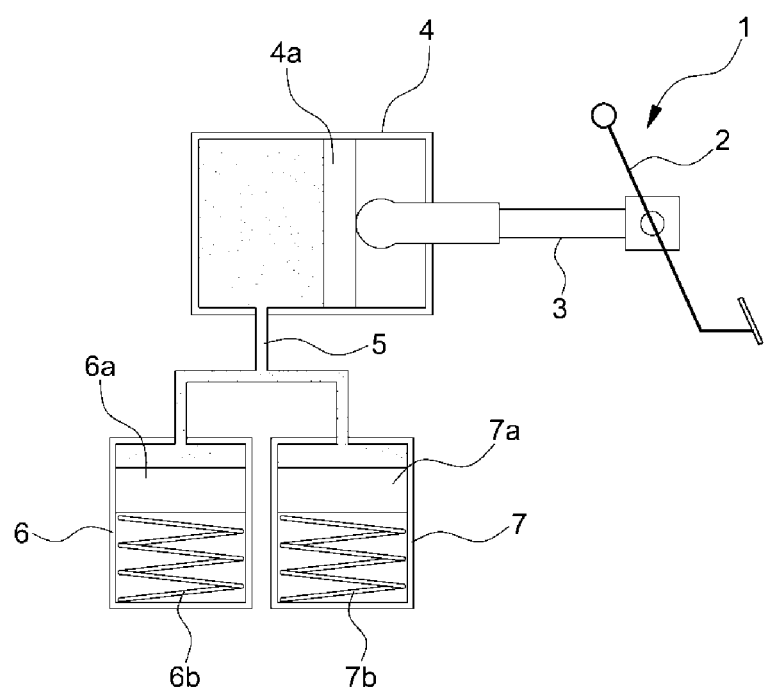
FIGS. 1 to 4 are a sectional view schematically illustrating configurations for realizing a pedal feeling according to the related art.
Figure 2:
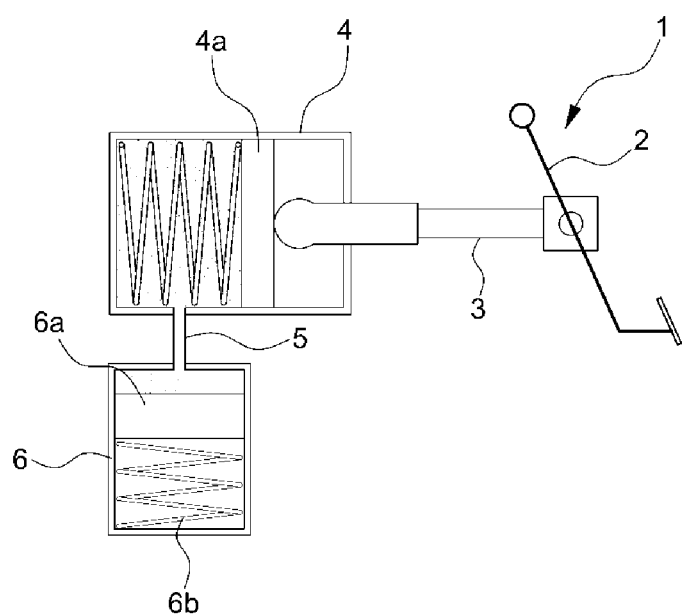
Figure 3:
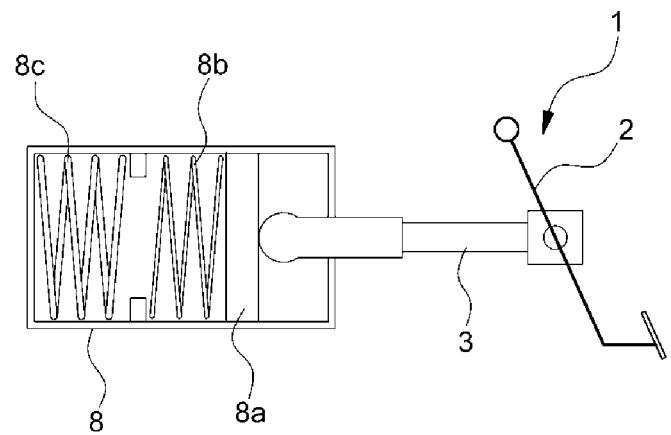
Figure 4:
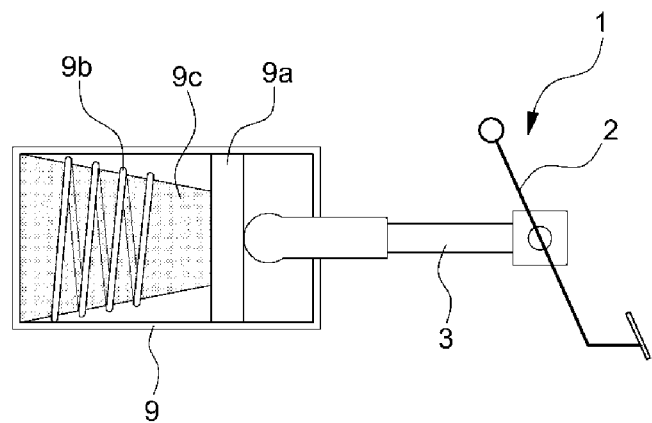
Figure 5:
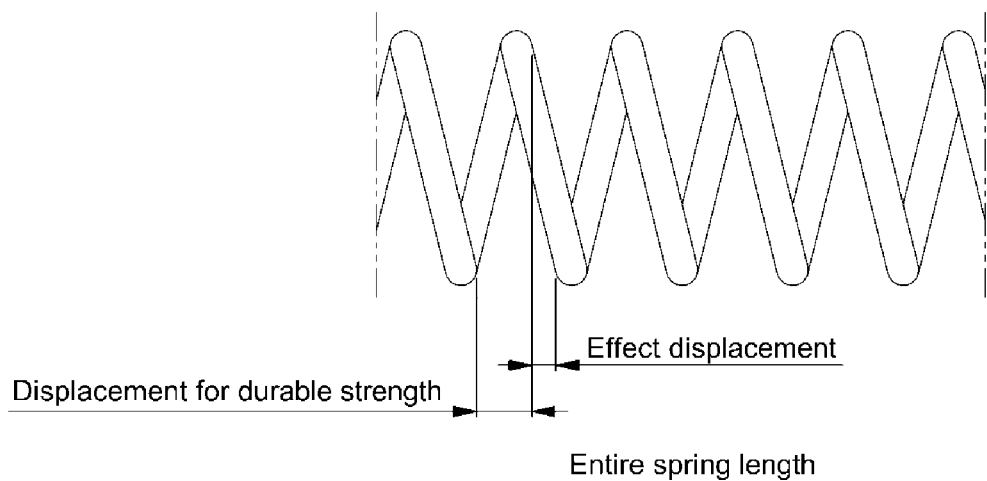
FIG. 5 is a view illustrating an entire length of a spring in which a wire diameter for determining a length of a spring and an effective displacement for securing an endurable strength are considered.
Figure 6:
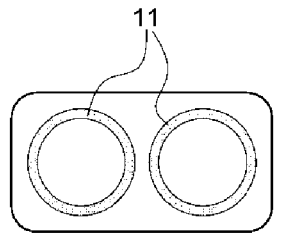
FIG. 6 is a schematic view illustrating configurations of pedal simulators in which springs are disposed in parallel according to the related art.
Figure 6:
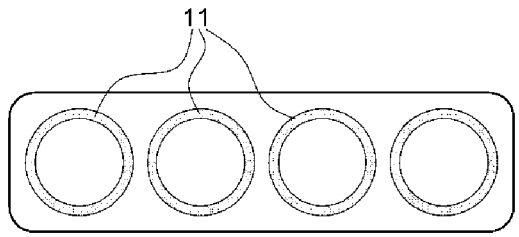
Figure 6:
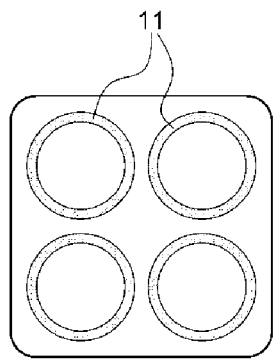
Figure 7:
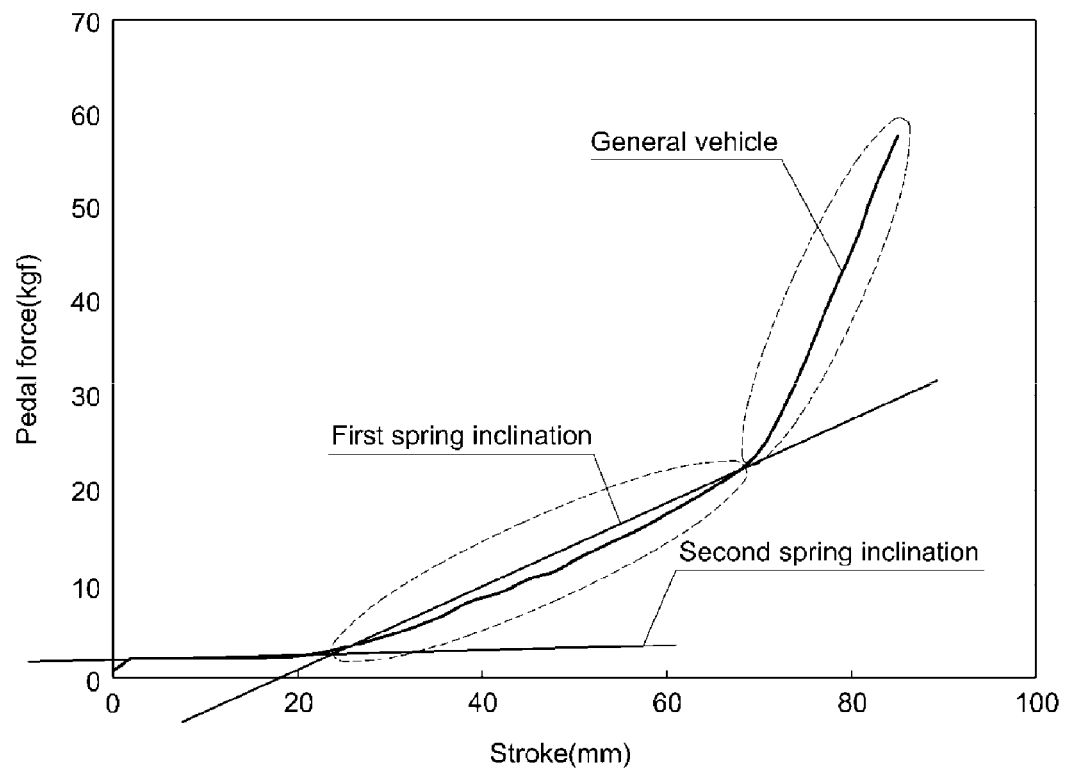
FIG. 7 is a graph depicting a stroke-pedal force pattern of a general vehicle and a stroke-pedal force pattern of a pedal simulator using two springs.
Figure 8:
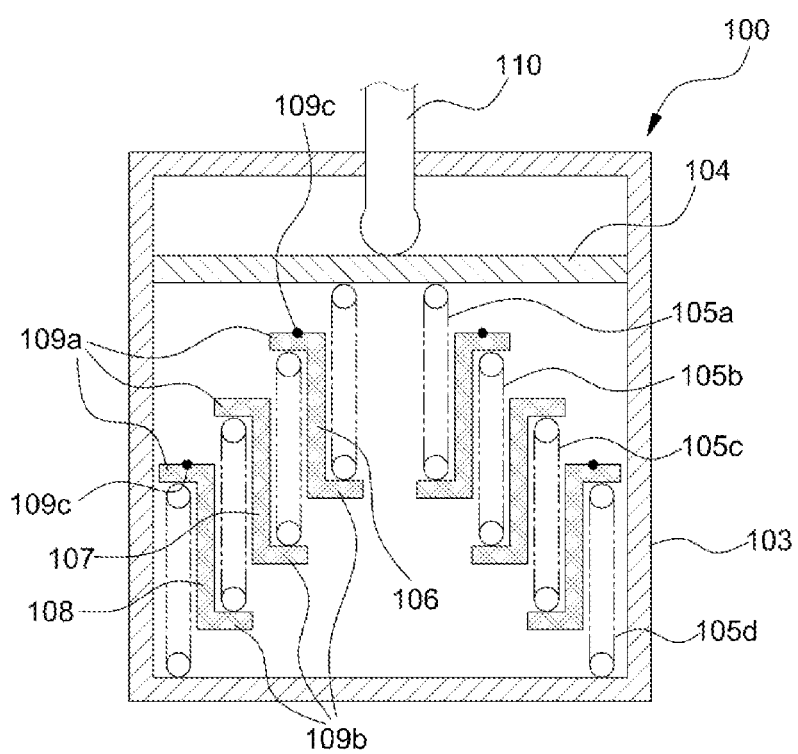
FIG. 8 is a sectional view illustrating a multi-stage series spring structure in a cylinder of an exemplary pedal simulator according to the present invention.
Figure 9:
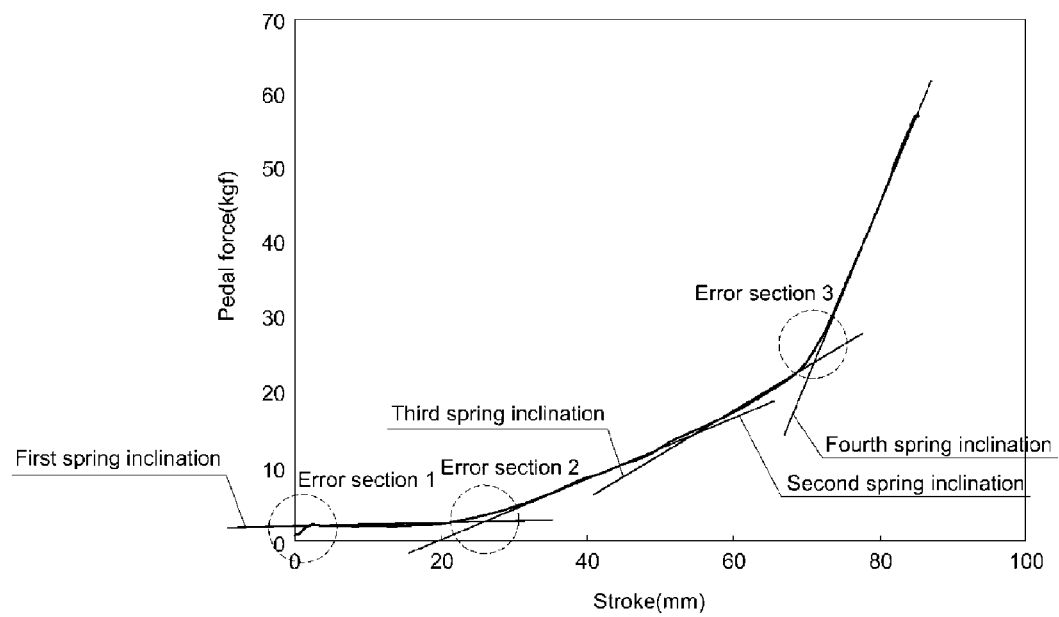
FIG. 9 is a graph depicting a stroke-pedal force pattern of an exemplary pedal simulator according to the present invention.

FIG. 8 is a sectional view illustrating a multi-stage series spring structure in a cylinder of a pedal simulator according to various embodiments of the present invention. FIG. 9 is a graph depicting a stroke-pedal force pattern of a pedal simulator according to various embodiments of the present invention.

FIG. 8 shows a new type of multi-stage series spring structure employing a pedal simulator of the present invention, and the pedal simulator 100 of the present invention includes a brake pedal by which a brake input of a driver is performed, an operation rod 110 connected to the brake pedal, a cylinder 103 into which the operation rod 110 is inserted, a piston 104 provided in the cylinder 103, a plurality of springs 105a to 105d connected in multi-stage series in the cylinder 103 to support the piston 104, a plurality of spring seats 106 to 108 installed in the cylinder 103 to support the springs 105a to 105d, and cushion members 109c installed in the spring seats 106 and 108 to contact the piston 104.

The operation rod 110 is a rod connected to the brake pedal stepped on by a driver during a brake operation such that one end thereof is connected to the pedal for receiving a brake input of the driver and an opposite end thereof is inserted into the cylinder 103 to be connected to the piston 104 accommodated in the cylinder 103. Accordingly, the operation rod 110 serves as a member for pressing and pushing or releasing the piston 104 while moving along a pedal stroke.

The piston 104 is provided to be moved by the operation rod 110 in the cylinder 103, and is installed to be resiliently supported by the plurality of springs 105a to 105d installed in the cylinder 103 to be connected to each other in multi-stage series.

The plurality of springs 105a to 105d are resilient members disposed between the cylinder 103 and the piston 104 to resiliently support the piston 104 in the cylinder 103, and may be realized by a plurality of coil springs concentrically disposed together with the spring seats 106 to 108 from the inner side to the outer side in the present invention.

The plurality of coil springs 105d to 105d are installed to support the piston 104 in a cylinder space opposite to a location of the operation rod 110, and the plurality of coil springs 105a to 105d are connected to and supported by each other while the spring seats 106 to 108 disposed concentrically from the inner side to the outer side being interposed therebetween.

In the present invention, the multi-stage spring disposition structure is a structure in which the plurality of springs 105a to 105d are connected to and supported by each other in multi-stage series between the piston 104 and the cylinder 103 while the spring seats 106 to 108 being interposed therebetween, and the plurality of springs 105a to 105d and the spring seats 106 to 108 are disposed concentrically from the inner side to the outer side to minimize an entire length and a volume thereof.

To this end, each of the spring seats 106 to 108 has a flange end 109a at one end thereof and has a cup shape having a bottom surface portion 109b at an opposite end thereof, and the springs 105a to 105c are disposed inside the spring seats 106 to 108 each having a cup shape.

The cup-shaped spring seats 106 to 108 are disposed from the inner side to the outer side, that is, in the form in which one spring seat is positioned to overlap another outer spring seat one by one, and accordingly, all the spring seats 106 to 108 has a concentrically overlapping structure.

Then, opposite ends of each of the springs 105b and 105c installed to be supported between the two spring seats 106 to 108 disposed from the inner side to the outer side are supported by the bottom surface portion 109b and the flange end 109a of the corresponding spring seat. The innermost spring 105a is disposed inside the innermost spring seat 106 such that opposite ends thereof are supported between the bottom surface portion 109b of the spring seat and a lower surface of the piston 104 (an inner surface of the piston) and the outermost spring 105b is disposed outside the outermost spring seat 108 such that opposite ends thereof are supported between the flange end 109a of the spring seat and a bottom surface of the cylinder 103.

In the configuration, the spring actually directly contacting the piston 104 is the innermost spring 105a of the plurality of springs, and the piston 104 is supported by the spring 105a while directly contacting the spring 105a.

Hereinafter, in the specification, the innermost spring 105a (the uppermost spring in the drawing) disposed to directly contact and support the piston will be referred to as a first spring, and the outer spring 105b disposed to support the piston while the first spring seat 106 being interposed between the first spring 105a and the outer spring 105b will be referred to as a second spring.

Another outer spring 105c disposed to support the piston while the second spring seat 107 being interposed between the second spring 105b and the outer spring 105c will be referred to as a third spring, and another outer spring 105d disposed to support the piston while the third spring seat 108 being interposed between the third spring 105c and the outer spring 105d will be referred to as a fourth spring.

Referring to FIG. 8, the first spring 105a, the second spring 105b, the third spring 105c, and the fourth spring 105d may be coil springs disposed from the inner side to the outer side, and the spring seats 106 to 108 interposed between the springs 105a to 105d may has a cup shape having the flange end 109a and the bottom surface portion 109b.

Then, the first spring 105a may be one coil spring installed between the piston 104 and the innermost first spring seat 106, and opposite ends of the first spring 105a located inside the first spring seat 106 is supported between the piston 104 and the bottom surface portion 109b of the first spring seat 106.

Then, the first spring 105a is installed to contact the piston 104 inside the first spring seat 106, and the piston 104 is supported by the first spring 105a inside the first spring seat 106 while directly contacting the first spring 105a.

The second spring 105b is mounted between the first spring seat 106 and the second spring seat 107. Then, the second spring 105b may be one coil spring located inside the second spring seat 107 to surround an outer side of the first spring seat 106, and opposite ends of the second spring 105b is supported between the flange end 109a of the first spring seat 106 and the bottom surface portion 109b of the second spring seat 107.

The third spring 105c is mounted between the second spring seat 107 and the third spring seat 107. Then, the third spring 105c may be one coil spring located inside the third spring seat 108 to surround an outer side of the second spring seat 107, and opposite ends of the third spring 105c is supported between the flange end 109a of the second spring seat 107 and the bottom surface portion 109b of the second spring seat 108.

The fourth spring 105d may be one coil spring installed between the outermost third spring seat 108 and the cylinder 103. Then, the fourth spring 105d is disposed to surround the third spring seat 108 and opposite ends thereof is supported between the flange end 109a of the third spring seat 108 and the bottom surface of the cylinder 103.

As a result, in the present invention, the plurality of springs (first to fourth springs) 105a to 105d disposed to overlap each other from the inner side to the outer side are connected in multi-stage series while the spring seats 106 to 108 being interposed therebetween and installed within the cylinder 103 to support the piston 104. Since the plurality of springs and the spring seats are disposed to overlap each other from the inner side to the outer side, an entire length of the springs can be minimized even when several springs are disposed in series.

That is, when compared of the case of using two springs according to the related art, even if three or more springs are connected to each other in series, the entire length of the springs and the volume of the cylinder can be minimized and a pedal simulator having a small entire spring length and a small cylinder volume can be configured.

If the operation rod 110 is operated in the multi-stage series structure, the flange end 109a of the first spring seat 106 first contacts the piston 104 while the operation rod 110 presses and pushes the piston 104, and the flange ends 109a of the second spring seat 107 and the third spring seat 108 are sequentially contact the piston 104.

In the structure, an error from a stroke-pedal force pattern of a general vehicle can be significantly reduced as compared with the structure according to the related art in which two springs are disposed in series. As an example, in the case of using four springs 105a to 105d as exemplified in FIG. 8, it is possible to illustrate a stroke-pedal force pattern line diagram classified into four sections by which a stroke-pedal force of a general vehicle can be pursued maximally.

That is, the four stroke-pedal force pattern line diagrams classified by the four springs 105a to 105d by using inclinations may be realized. Then, although errors from a stroke-pedal force pattern of a general vehicle are generated to some degree while the line is bent at portions in which the lines of the springs are connected to each other, that is, at portions having different inclinations, stroke-pedal force characteristics by which a stroke-pedal force pattern of a general vehicle can be pursued maximally can be represented by increasing the number of springs, as compared with the case of using two springs.

Referring to FIG. 8, various embodiments may employ a total of four springs 105a to 105d and three spring seats 106 and 108, and the numbers of the springs and the spring seats may be changed. For example, it is also possible to configure a multi-stage series spring structure by employing five springs and four spring seats, six springs and five spring seats, or three springs and two spring seats.

In this way, in the present invention, the numbers of springs and spring seats configuring the multi-series structure are not specifically limited and the present invention is not limited to embodiments of the type shown in FIG. 8 (employing four springs and three spring seats). Accordingly, the numbers of springs and spring seats may be properly modified while the multi-stage series structure in FIG. 8 is applied, and the modifications fall within the scope of the present invention.

Referring to FIG. 9, error sections in which the line is abruptly bent due to changes in inclinations by the springs are present at portions where the lines of the springs are connected to each other, and the separate cushion members 109c contacting the piston 104 may be installed at the flange ends 109a of the spring seats 106 to 108 to reduce the errors.

The cushion members 109c may be formed of a rubber material and fixed to the flange ends 109a, and when the cushion members 109c are installed, the errors at the portions where the lines of the springs are connected to each other can be reduced and characteristics in which a stroke-pedal force pattern of a general vehicle can be pursued maximally can be obtained.

Referring to FIG. 8, the cushion members 109c are installed only at the flange ends 109a of the first spring seat 106 and the third spring seat 108, and in this way, the cushion members may be installed only some of the spring seats selected to maximally pursue a stroke-pedal force pattern of a general vehicle.

In FIG. 9, an error (an error from a stroke-pedal force pattern of a general vehicle) in an error section 1 can be corrected by an initial mounting load setting, and an error in an error section 2 can be corrected by the cushion member 109c installed in the first spring seat 106.

Further, an error in an error section 3 can be corrected by installing the cushion member 109c in the third spring seat 108, and since an error is rarely generated in a portion where the line of the second spring and the line of the third spring are connected to each other (the inclination change of the lines is not large and the lines are not bent greatly), the second spring seat 107 may not employ a cushion member.

In this way, the discontinuities in the sections in which inclination changes of the spring line are relatively large can be solved by installing the cushion members contacting the piston in the selected spring seats. Further, characteristics in which the line is smoothly bent at the connecting portions of the spring lines can be shown so that a stroke-pedal force pattern of a general vehicle can be pursued maximally, reducing an error maximally.

Of course, it is possible to install cushion members of a rubber material in all the spring seats if necessary.

Figure 10:
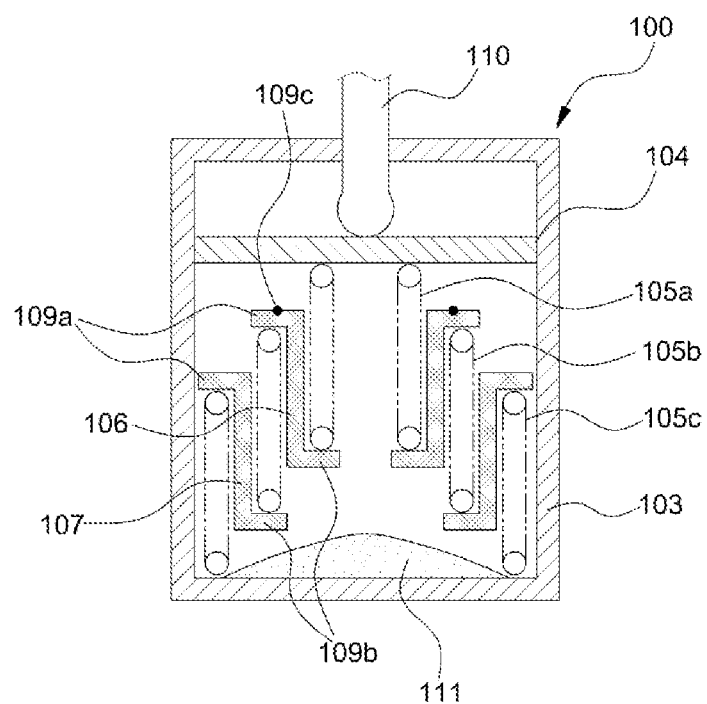
FIG. 10 is a sectional view illustrating a multi-stage series spring structure in a cylinder of an exemplary pedal simulator according to the present invention.

FIG. 10 is a sectional view illustrating a multi-stage series spring structure in a cylinder of a pedal simulator according to various embodiments of the present invention.

FIG. 10 corresponds to various embodiments in which a separate cushion member 111 which can contact the spring seats 106 and 107 during movement of the piston 104, compression of the springs 105a to 105c, and movement of the spring seats 106 and 107 is installed on the bottom surface of the cylinder 103, and the separate cushion member 111 may be manufactured of a rubber material and installed at a center of the bottom surface of the cylinder 103.

The cushion member 111 may be installed such that a center thereof is convex toward the upper side on the bottom surface of the cylinder 103.

The cushion member 111 provides the stroke-pedal force characteristics in the final pedal force increase inclination section in the stroke-pedal force pattern line diagram of FIG. 9, and the cushion member 111 performs the outermost spring (105d of FIG. 8) (the lowermost spring in the drawing, that is, the fourth spring) providing the stroke-pedal force characteristics in the final pedal force increase inclination section in the multi-stage series spring structure.

In this way, when the separate cushion member 111 functioning as the outermost spring is installed, the outermost spring (105d of FIG. 8) may be deleted as compared with the above mentioned embodiments in which a same number of inclination sections are simulated and the spring seat (108 of FIG. 8) supporting the spring 105d may be deleted, whereby an outer diameter and a volume of the cylinder 103 employing them can be reduced, achieving a more compact structure.

In addition, the number of parts, manufacturing costs, and weight thereof can be reduced as compared with the above mentioned embodiments.

Referring to FIG. 10, as compared with embodiments of the type shown in FIG. 8, one spring and one spring seat disposed on the outermost side, that is, the fourth spring 105d and the third spring seat 108 are deleted, so that the multi-stage series spring structure is configured by a total of three springs 105a to 105c and two spring seats 106 and 107.

Even in this case, since the cushion member 111 is in charge of one inclination section in the line diagram, a pedal simulator capable of simulating a stroke-pedal force pattern in a general vehicle in a maximally similar way can be configured.

Of course, although it has been described that one spring and one spring seat are deleted as compared with embodiments of the type shown in FIG. 8 in the description of embodiment of the type shown in FIG. 10, it is only to describe that the cushion member 111 on the bottom surface portion of the cylinder applied to embodiments of the type shown in FIG. 10 replaces an operation of the outermost spring. Accordingly, the numbers of springs and spring seats are not limited to three and two, respectively, and may be properly modified to the numbers by which the stroke-pedal force pattern can be maximally simulated.

In this way, in the present invention, by applying the above-described multi-stage series spring structure, an entire length and a volume of the spring can be minimized even if three or more multi-stage series spring is used unlike the related art, and in particular, the stroke-pedal force characteristics of a general vehicle can be simulated in a still more similar way, significantly improving a pedal force.

In addition, since the entire length of the spring and the volume of the system are not increased significantly even if several springs are disposed in a multi-stage series form, a mounting performance of the pedal simulator can be improved.

Further, since a cushion member of a rubber material is used, the stroke-pedal force characteristics in a section in which the line inclinations of the springs are greatly changed, improving a pedal feeling.

Meanwhile, the above-described multi-stage series spring structure may be applied to some or all cylinders selected from a main cylinder 120 and auxiliary cylinders 130 and 140 of the pedal simulator including the main cylinder 120 to which the operation rod 110 is directly connected, and the auxiliary cylinders 130 and 140 connected from the main cylinder 120 through hydraulic pressure pipes 125 and configured to receive a hydraulic pressure from the main cylinder through the hydraulic pressure pipes as the main cylinder 120 receiving a force of the operation rod 110 and the piston 121 are moved.

Figure 11:
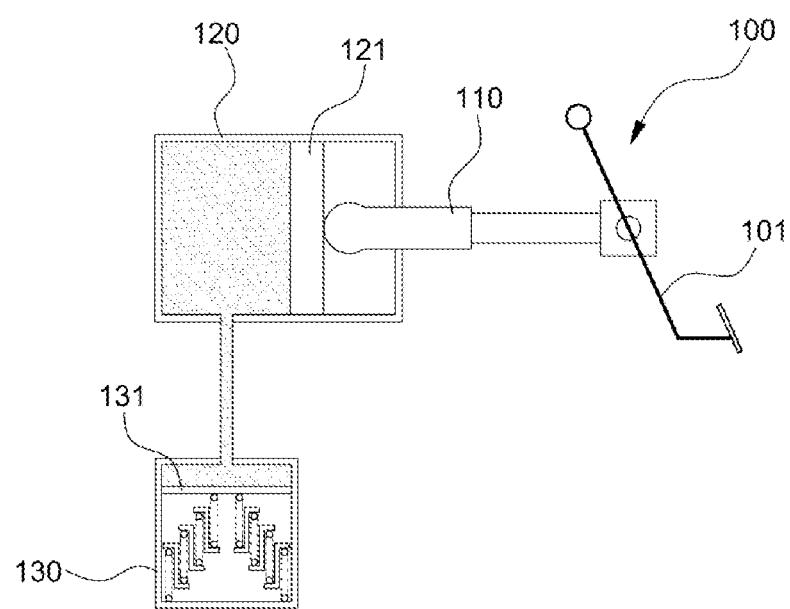
FIGS. 11 to 13 are views illustrating other exemplary pedal simulators of the present invention.
Figure 12:
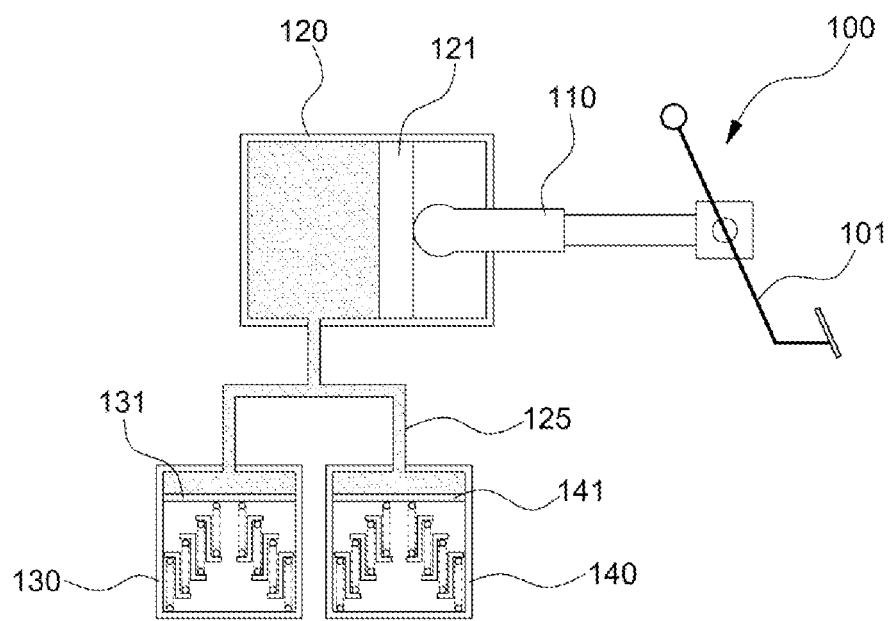
Figure 13:
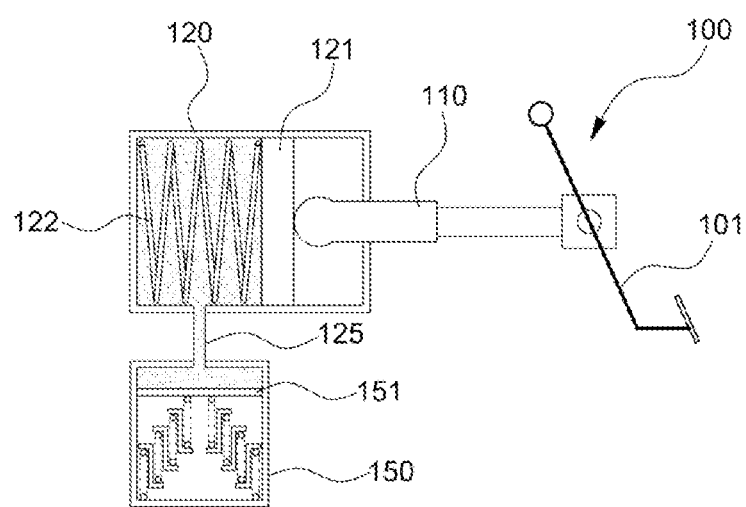

Various embodiments, as as illustrated in FIGS. 11 to 13, a spring is not installed in the main cylinder 120 and a multi-stage series spring structure (the structures of springs and spring seats are the same as those of FIG. 8) may be applied to the auxiliary cylinder 130 connected through the hydraulic pressure pipe 125.

Of course, the multi-stage series cylinder structure of FIG. 8 may be applied only to the main cylinder 120 or may be applied to both the main cylinder 120 and the auxiliary cylinder 130.

Further, as illustrated in FIG. 12, a spring is not installed in the main cylinder, and the multi-stage series spring structure (the structures of springs and spring seats are the same as those of FIG. 8) may be applied to one or both of the two auxiliary cylinders 130 and 140 connected in parallel through the hydraulic pressure pipes 125.

Even in this case, the multi-stage series cylinder structure of FIG. 8 may be applied only to the main cylinder 120 or may be applied to both the main cylinder 120 and any one or both of the auxiliary cylinders 130 and 140.

FIG. 13 is a view illustrating various embodiments in which a multi-stage spring structure is applied only to the main cylinder 120. Here, the multi-stage series spring structure may be applied to any one or both of a main cylinder 120 and an auxiliary cylinder 150 of the pedal simulator including the main cylinder 120 in which a piston 121 to which an operation rod 110 is connected is supported by a spring 122 and an oil pressure, and an auxiliary cylinder 150 connected from the main cylinder 120 through the hydraulic pressure pipe 125 to receive a hydraulic pressure from the main cylinder 120 through the hydraulic pipe 125 as the piston 121 of the main cylinder 120 receiving a force of the operation rod 110 is moved.

As described above, in various embodiments employing the main cylinder 120 and the auxiliary cylinders 130, 140, and 150, when the multi-stage series spring structure is applied only to an interior space (filled with oil) of the main cylinder 120, surfaces opposite to the surfaces of the pistons 131, 141, and 151 of the auxiliary cylinders 130, 140, and 150 to which a hydraulic pressure transferred from the main cylinder 120 through the hydraulic pipe 125 is applied are supported by one spring as in the related art.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedal simulator using a multi-stage series spring, comprising:
   a cylinder into which an operation rod connected to a brake pedal is inserted;
   a piston installed in the cylinder to receive a force of the operation rod;
   a plurality of springs installed between the cylinder and the piston to resiliently support the piston in the cylinder and disposed to overlap each other from an inner side to an outer side; and
   a plurality of spring seats disposed in the cylinder to overlap each other from an inner side to an outer side and configured to support the springs while being interposed between the springs, the plurality of springs including a first spring, at least one second spring, and a third spring,
   wherein each of the spring seats has a flange end at one end thereof, and a cup shape having a bottom surface portion at an opposite end thereof, the spring seats are selectively engaged by the piston at the flange ends of the spring seats, and the springs are disposed inside the spring seats in a multi-stage spring disposition series structure, the plurality of spring seats including an innermost spring seat and an outermost spring seat,
   wherein the first spring is installed between the piston and the innermost spring seat, the at least one second spring is positioned between a flange end of one of the spring seats and a bottom surface portion of another of the spring seats adjacent to the one of the spring seats, and a third springs is positioned between a flange end of the outermost spring seat and a bottom surface of the cylinder, and
   wherein a cushion member contacting the outmost spring seat during movement of the piston is installed at the bottom surface of the cylinder.

2. The pedal simulator of claim 1, wherein the springs are coil springs concentrically disposed to overlap each other from an inner side to an outer side.

3. A pedal simulator comprising:
   a main cylinder into which an operation rod connected to a brake pedal is inserted, in which a piston for receiving a force of the operation rod is installed, and in which oil is filled to receive a force of the piston; and
   at least one auxiliary cylinder connected to the main cylinder through a hydraulic pressure pipe and resiliently supported by a spring while receiving a hydraulic pressure transferred from the main cylinder through the hydraulic pressure pipe,
   wherein the auxiliary cylinder includes:
   a plurality of springs installed between the auxiliary cylinder and the auxiliary cylinder piston to resiliently support the auxiliary cylinder piston and disposed to overlap each other from an inner side to an outer side, the plurality of springs including a first spring, at least one second spring, and a third spring; and
   a plurality of spring seats including an innermost spring seat and an outermost spring seat and disposed in the auxiliary cylinder to overlap each other from an inner side to an outer side and configured to support the springs while being interposed between the springs, and
   wherein the first spring is installed between the auxiliary cylinder piston and the innermost spring seat, the at least one second spring is positioned between a flange end of one of the spring seats and a bottom surface portion of another of the spring seats adjacent to the one of the spring seats, and a third springs is positioned between a flange end of the outermost spring seat and the auxiliary cylinder, such that the spring seats are selectively engaged by the auxiliary cylinder piston at flange ends of the spring seats and all the springs are connected to each other in a multi-stage series structure,
   wherein the first spring is installed between the piston and the innermost spring seat, the at least one second spring is positioned between a flange end of one of the spring seats and a bottom surface portion of another of the spring seats adjacent to the one of the spring seats, and a third springs is positioned between a flange end of the outermost spring seat and a bottom surface of the cylinder, and
   wherein each of the spring seats has the flange end at one end thereof, and has a cup shape having a bottom surface portion at an opposite end thereof,
   wherein the spring seats are concentrically disposed to overlap each other from an inner side to an outer side, and
   wherein a cushion member contacting the spring seats is installed at a bottom surface of the auxiliary cylinder.

4. The pedal simulator of claim 3, wherein the springs are coil springs concentrically disposed to overlap each other from an inner side to an outer side.

* * * * *